United States Patent
Harada et al.

[11] Patent Number: 6,064,561
[45] Date of Patent: May 16, 2000

[54] ELECTRIC DOUBLE LAYER CAPACITOR

[75] Inventors: Gaku Harada; Koji Sakata; Junko Kurihara, all of Tokyo, Japan

[73] Assignee: NEC Corporation, Tokyo, Japan

[21] Appl. No.: 09/050,637

[22] Filed: Mar. 27, 1998

[30] Foreign Application Priority Data

Mar. 28, 1997 [JP] Japan ..................... 9-094612

[51] Int. Cl.[7] .................. H01G 9/00; H01G 9/02
[52] U.S. Cl. ................. 361/502; 361/512; 29/25.03
[58] Field of Search ................... 361/502, 508, 361/511, 512, 516, 520, 528, 529, 530, 532; 29/25.03

[56] References Cited

U.S. PATENT DOCUMENTS

| | | | |
|---|---|---|---|
| 4,626,964 | 12/1986 | Azuma et al. | 361/502 |
| 4,633,372 | 12/1986 | Calahan et al. | 361/502 |
| 4,725,926 | 2/1988 | Morimoto et al. | 361/502 |
| 4,731,705 | 3/1988 | Velasco et al. | 361/502 |
| 4,748,542 | 5/1988 | Lundsgaard | 361/502 |
| 4,757,424 | 7/1988 | Morimoto et al. | 361/502 |
| 5,381,303 | 1/1995 | Yoshida et al. | 361/502 |
| 5,381,323 | 1/1995 | Yoshida et al. | 361/502 |
| 5,786,981 | 7/1998 | Aoki et al. | 361/502 |

FOREIGN PATENT DOCUMENTS

| | | | |
|---|---|---|---|
| 3283518 | 12/1991 | Japan | H01G 9/00 |
| 3283521 | 12/1991 | Japan | H01G 9/00 |
| 582396 | 4/1993 | Japan | H01G 9/00 |
| 684701 | 3/1994 | Japan | H01G 9/00 |

*Primary Examiner*—Kristine Kincaid
*Assistant Examiner*—Anthony Dinkins
*Attorney, Agent, or Firm*—Hayes Soloway Hennessey Grossman & Hage PC

[57] ABSTRACT

A thin-type electric double layer capacitor having low internal resistance.

This capacitor includes pairs of a current collector and polarizable electrode disposed opposite to each other with a separator being interposed therebetween. The current collector and polarizable electrode, each containing a thermoplastic binder resin and carbon, are made integral by compatibilization of the thermoplastic binder resins. Polarizable electrode faring with the separator is disposed on the plane as that for the current collector. In this capacitor, the glass-transition temperature of the thermoplastic binder resin contained in the current collector is lower than that of the thermoplastic binder resin contained in the polarizable electrode.

10 Claims, 2 Drawing Sheets

1 ; CURRENT COLLECTOR
2 ; POLARIZABLE ELECTRODE
3 ; SEPARATOR
4 ; GASKET

ELECTRIC DOUBLE LAYER CAPACITOR

FIELD OF THE INVENTION

The present invention relates to an electric double layer capacitor and more particularly to a thin-type electric double layer capacitor wherein contact resistance between a polarizable electrode and a current collector in the electric double layer capacitor is reduced and a manufacturing method for same.

RELATED ART

A conventional electric double layer capacitor has been widely used as a capacitor of the thin-type having a large capacity as a backup device for microcomputer, memory, timer and the like, and there are vigorous research and development for an increase in performance. In order to reduce internal resistance of the electric double layer capacitor and to improve its characteristics, the following technologies have been disclosed.

(1) For example, JP Patent Kokai JP-A-6-84701 (1994) discloses an electric double layer capacitor comprising multilayer structure electrodes wherein current collector and polarizable electrode materials are dispersed mutually therein and integrated at an interface between a current collector and a polarizable electrode for improving its internal resistance.

(2) Also, for example, JP Patent Kokai JP-A-3-283518 (1991) and in JP Patent Kokai JP-A-5-82396 (1993) disclose electric double layer capacitors wherein an electrically conductive adhesive layer has been provided at an interface between a current collector and polarizable electrode, and the current collector, the electrically conductive adhesive layer and polarizable electrodes are connected electrically and mechanically by thermocompression bonding in order to improve its internal resistance. The electrically conductive adhesive layers disclosed in these gazettes contain a thermoplastic resin which is heated and cured at the time of thermocompression bonding to unite the current collector with the polarizable electrode. Besides, the polarizable electrode has been obtained by sintering fine grains of carbon.

(3) Furthermore, for example, JP Patent Kokai JP-A-3-283521 (1991) discloses an electric double layer capacitor having improved bonding between a polarizable electrode and current collector. In the electric double layer capacitor disclosed in this gazette, a heated and softened conductive resin is rolled to form a current collector and, at the time when this current collector is in a softened state, the polarizable electrode is buried or embedded by pressing by heat to a specified extent into the current collector.

SUMMARY OF THE DISCLOSURE

However the following problems have been encountered during the investigations toward the present invention. In fact, a conventional electric double layer capacitor having small internal resistance as well as of thin-type has not yet been implemented. A detailed explanation will be provided hereafter.

(1) In the electric double layer capacitor disclosed in JP Patent Kokai JP-A-6-84701 (1994), there is a problem that though it has small internal resistance but a requirement for implementing a thin-type capacitor has not been satisfied.

The small internal resistance is achieved by firing for material thermal dispersion of current collector and polarizable electrode materials at an interface to integrate them into one structure.

On the other hand, the reason why the requirement for implementing a thin-type capacitor has not been satisfied can be explained by the fact that the thickness of the electric double layer capacitor as a whole is equal to the sum of a thickness of each of the current collector, polarizable electrode and separator constituting the capacitor device.

Referring to FIG. 3 to be later described as a comparison example, in the electric double layer capacitor wherein the current collector and polarizable electrode are disposed opposite to each other with the separator being interposed therebetween, the current collector 1, polarizable electrode 2, separator 3, polarizable electrode 2 and current collector 1 are in order laminated thereon, the surface of the polarizable electrode facing with(contacting) the separator is disposed on a surface which is different from a surface of the current collector directed to the separator (i.e., not of the same height).

(2) Moreover, in the electric double layer capacitors disclosed in said JP Patent Kokai JP-A-3-283518 and JP-A-5-82396, there is a problem that the requirement for reducing internal resistance and for achieving the thin-type product.

The reason for being unable to satisfactorily reduce the internal resistance is that a layer containing a resin is formed at an interface(intermediate) between the current collector and polarizable electrode. Also, the reason for being not unable to meet the requirement for achieving a thin-type product is the same as described in above (1).

(3) The electric double layer capacitor disclosed in said JP Patent Kokai JP-A-3-283521 can be made thin, but have a problem of large internal resistance.

The reason for being able to achieve a thin-type product is that, because the polarizable electrode is embedded in the current collector, the thickness of the capacitor is less than the sum of a thickness of each of component materials. On the other hand, the reason for having a large internal resistance is that, because the current collector and polarizable electrode are merely bonded by compression and not integrated, the polarizable electrode is peeled off from the current collector due to vibration and/or expansion of the polarizable electrode caused by permeation of an electrolytic solution during a long period of use, causing a large internal resistance.

Therefore, the present invention has been achieved taking into account these considerations described above, and it is an object of the present invention to solve above problems:

It is a further object of the invention to provide a novel thin-type electric layer capacitor having low resistance and method for manufacturing of the same.

Further objects will become apparent in the entire disclosure.

To achieve said object, there is provided an electric double layer capacitor according to an aspect. The electric double layer capacitor generally comprises a current collector and a polarizable electrode which are disposed opposite to each other with a separator being interposed therebetween. Each of said current collector and said polarizable electrode contains at least a thermoplastic binder resin and carbon. The current collector and the polarizable electrode are made integral through compatibilization of both thermoplastic binder resins contained therein. The polarizable electrode placed has a surface facing with the separator. This surface is disposed on the same plane as that for the current collector. Namely, the end surface of the current collector contacting the separator is on the same plane as the surface of the polaziable electrode contacting the separator.

In another aspect of the present invention, the thermoplastic binder resin contained in the current collector has a glass-transition temperature lower than that of the thermoplastic binder resin contained in the polarizable electrode.

An example of such combined use of the thermoplastic resin contained in the polarizable electrode and the current collector includes respectively, for example, polyethylene (glass-transition temperature Tg=141° C. versus ABS resin (Tg=96° C.), and polypropylene (Tg=170° C.) versus polyvinyl chloride (Tg=75° C.). Also, it includes two kinds of polyvinyl butyrate each having different ratio of component (one having a ratio of component being PVAc:PVA:PVB= 2:21:77, Tg=71° C. and the other having a ratio of component being PVAc:PVA:PVB=2:17:81, Tg=93° C.) or polyethylene versus ABS resin (Tg=96° C.) or polypropylene (Tg=170° C.) versus polyvinyl chloride (Tg=75° C.).

Also, according to a further aspect of the present invention, there is provided a method of manufacturing an electric double layer capacitor consisting of a current collector and a polarizable electrode disposed opposite to each other via a separator interposed between them. The method comprises following steps:

(a) laminating a current collector wherein carbon is dispersed in a thermoplastic binder resin and a polarizable electrode wherein carbon is dispersed in a thermoplastic binder resin, provided that a specific combination of materials is used. Namely, the glass-transition temperature T1 of the thermoplastic binder resin contained in the current collector is lower than the glass-transition temperature T2 of the thermoplastic binder resin contained in the polarizable electrode, (b) heating, softening and pressing said laminated current collector and said polarizable electrode at a temperature equal to or higher than the glass-transition temperature T1 and lower than T2 and producing an electrode so that both end surfaces of said polarizable electrode and of said current collector are disposed on the approximately same plane, (c) compatibilizing the binder resins of the current collector and of the polarizable electrode by heating at a temperature equal to or higher than the glass-transition temperature T2 of the polarizable electrode to integrate them into one structure, and (d) producing a basic cell unit of the electric double capacitor by assembling the electrodes each having the integral structure comprising the obtained current collector and the polarizable electrode opposing each other via the separator interposed between them.

MODE FOR CARRYING OUT THE INVENTION

The mode for carrying out the invention will be described. In a preferred embodiment of an electric double layer capacitor of the present invention, a current collector (reference no. 1 in FIG. 1) and a polarizable electrode (reference no. 2 in FIG. 1) are disposed opposite each other and a separator (reference no. 3 in FIG. 3) lies between them and both the current collector and the polarizable electrode contain, at least, a thermoplastic binder resin and carbon wherein the current collector and polarizable electrode are integrated by the compatibilization of the thermoplastic binder resin and the polarizable electrode disposed facing the separator and the current collector are so configured to form the same plane contacting the separator.

This structure is achieved by compression lamination under the softened state of the thermoplastic binder resin of the current collector which reduces the thickness upon compression.

To manufacture the electric double layer capacitor of the present invention, a thermocompression bonding method which may be known one, can be utilized. That is, the current collector and the polarizable electrode are bonded by thermocompression and by using compatibility of the thermoplastic binder resin contained in them, they are integrated to form one structure.

The present invention is characterized in that the polarizable electrode and the current collector, each containing the thermoplastic binder resin having a different glass-transition temperature, are configured to form the same plane by using the thermocompression bonding.

By setting the glass transition temperature (T1) of the thermoplastic binder resin contained in the current collector (reference no. 1 in FIG. 1) to be lower than that (T2) of the thermoplastic binder resin contained in the polarizable electrode (reference no. 2 in FIG. 1) (i.e., T1<T2), and by setting the heating temperature between the glass-transition temperatures T1 and T2, the shape of the polarizable electrode wherein its temperature does not reach its glass-transition temperature is maintained while the thermoplastic binder resin contained in the current collector which exceeds its glass-transition temperature is softened and the polarizable electrode maintaining the shape under pressure is buried (embedded) into the current collector. Then, by raising the temperature up to more than the glass-transition temperature (T2) of the polarizable electrode, both the thermoplastic resins contained in the polarizable electrode and current collector are compatibilized to form one integrated structure having an ideal connection.

Moreover, in the electric double layer capacitor disclosed in said JP Patent Kokai JP-A-3-283521, though the current collector has thermoplasticity, as the polarizable electrode is a sintered solid body, the current collector and the polarizable electrode cannot be integrated into one structure even by thermocompression bonding. Therefore, this double layer capacitor is quite different in structure from that of the present invention.

EMBODIMENTS

To provide a detailed explanation of the mode for carrying out the invention, the embodiment of the present invention will be hereinafter described with reference to the accompanying drawings. In summary, the method of manufacturing the electric double layer capacitor may include the use a known thermocompression bonding technique. That is, both the current collector comprising the thermoplastic binder resin with carbon dispersed therein and the polarizable electrode comprising an electrically conductive porous substance wherein activated carbon is dispersed in the thermoplastic binder resin are laminated.

As described above, the thermoplastic binder resins are combined in such a manner that T1<T2, where T1 is a glass-transition temperature of the thermoplastic binder resin contained in the current collector and T2 is a glass-transition temperature of the thermoplastic binder resin contained in the polarizable electrode.

Then, the laminated current collector and polarizable electrode are heated at a temperature which is equal to or higher than the glass-transition temperature T1 and lower than T2 to be softened and pressurized to form an electrode wherein the polarizable electrode and the end face of the current collector at the marginal area lie on the same plane each abutting to the separator.

By heating the polarizable electrode up to a temperature which is higher than its glass-transition temperature (T2), the binders contained in the current collector and polarizable electrode are compatibized and integrated into one structure.

The obtained electrodes integrally comprising the current collector and the polarizable electrode are assembled opposite to each other, with a separator being interposed therebetween, to complete a basic cell unit of an electric double capacitor.

Generally, to obtain required pressure resistance, a laminated body comprising a plurality of said basic cell units of for the electric double layer capacitor is manufactured as a finished product.

The invention will now be described in more detail with reference to the accompanying drawings, in which specific embodiments of the present invention are shown.

Embodiment 1

Figure 1:
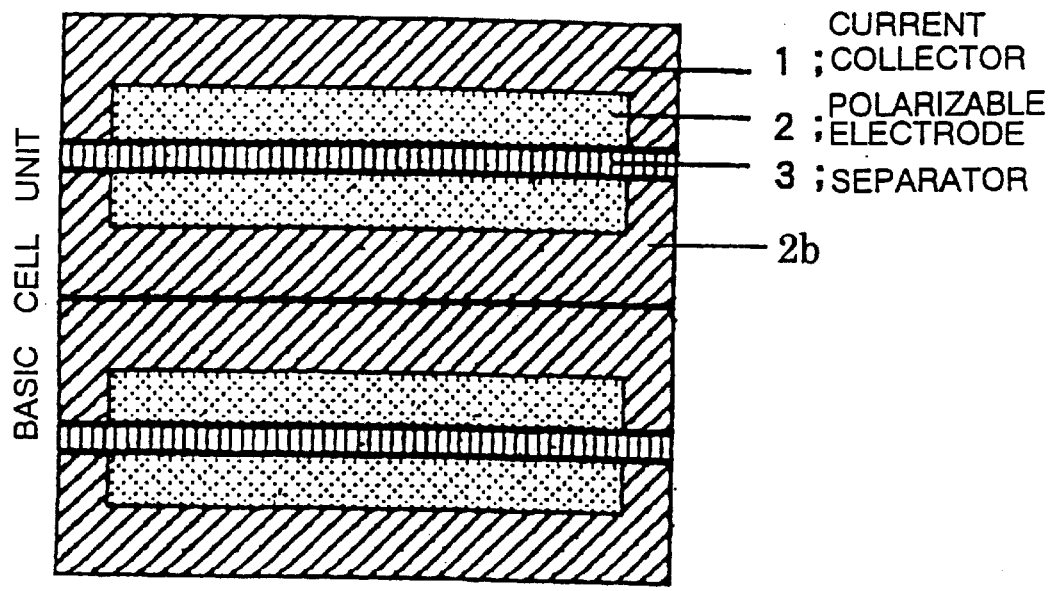
FIG. 1 is a sectional view of the electric double layer capacitor in the embodiment 1 of the present invention.

FIG. 1 is a sectional view of a structure of an electric double layer device in embodiment 1 according to the present invention, illustrating a laminated structure comprising two basic cell units of the electric double layer capacitor device.

Referring to FIG. 1, a current collector 1 (with a thickness of 100 μm) contains a thermoplastic binder resin composed of polyvinyl butyrate wherein fine grains of carbon are dispersed. A polarizable electrode 2 (with a thickness of 40 μm) contains a thermoplastic binder resin composed of polyvinyl butyrate wherein fine grains of activated carbon are dispersed. At an interface between the current collector 1 and the polarizable electrode 2, the thermoplastic binder resin is compatibilized by heating, to integrate the current collector 1 and the polarizable electrode 2 into one structure. Moreover, the polarizable electrode 2 placed facing with a separator 3 (with a thickness of 25 μm) and the current collector 1 are disposed on the same plane.

A method of manufacturing the electric double layer capacitor device of the embodiment is hereinafter described.

To produce a current collector, a thermoplastic binder resin polyvinyl butyrate (ratio of compositions of PVAc:PVA:PVB=2:21:77, average degree of polymerization being 300, glass-transition temperature being 71° C.) was added preferably by about 20% by weight to the carbon fine grains having 10 μm in diameter and also buthylphthalyl butylglycolate was added as a plasticizer and 2-(2-butoxy ethoxy) ethanol as a boiling-point regulating agent and blended.

To produce a polarizable electrode, a thermoplastic binder resin polyvinyl butyrate (ratio of compositions of PVAc:PVA:PVB=2:17:81, average degree of polymerization being 2400, glass-transition temperature being 93° C.) was added preferably by about 5.0% by weight, and also buthylphthalyl butylglycolate was added as a plasticizer and blended.

By using a doctor blade, current collector and polarizable electrode sheets were formed from the prepared current collector and polarizable electrode materials. The thickness of the current collector and polarizable electrode sheets was 100 μm and 40 μm respectively. Each of the sheets was then cut to form a specified shape and to obtain the current collector 1 and polarizable electrode 2.

The polarizable electrode 2 was laminated on the current collector 1 which had been cut to form a specified shape and was then subjected to themo-compression for one hour under conditions of a press pressure being 300 kg/cm$^2$ and a press temperature being 80° C. so that marginal area of the current collector and the polarizable electrode are caused to come to the same plane. The press temperature of 80° C. is higher than that of the glass-transition temperature of the thermoplastic binder resin contained in the current collector and lower than that of the glass-transition temperature of the thermoplastic binder resin contained in the polarizable electrode.

After one hour's press formation under the press pressure of 300 kg/cm$^2$ and press temperature of 110° C., each thermoplastic binder resin contained respectively in the current collector and the polarizable electrode was compatibilized to integrate both members current collector and polarizable electrode into one unitary structure. Finally, the polarizable electrodes were impregnated with 40% by weight aqueous solution of sulfuric acid as an electrolytic solution and were disposed opposite to each other with a separator being interposed between them to obtain a basic cell unit of an electric double layer capacitor.

Then, two of resultant electric double layer capacitor basic cell units were laminated to complete an electric double layer device.

The thickness of the completed electric double layer capacitor was 410 μm (refer to Table 1).

TABLE 1

|  | Thickness of device(μm) | Internal Resistance(mΩ) |
| --- | --- | --- |
| Embodiment 1 | 410 | 10 |
| Embodiment 2 | 320 | 15 |
| Comparison example 1 | 650 | 200 |

This is because the thickness of the electric double layer device could be made less than the sum of thickness of composing materials by the combined use of the thermoplastic binder resins for both the current collector and the polarizable electrode as shown in FIG. 1 and by burying (embedding) the whole polarizable electrode into the current collector. Also, the internal resistance of the completed electric double layer capacitor was 10 Ωm which was sufficiently small.

Additionally, in the embodiment, although 40% aqueous solution of sulfuric acid was used as an electrolytic solution, it is not limited to the sulfuric acid solution and organic solution can be also used as an electrolytic solution.

Moreover, though polyvinyl butyrate was used as a thermoplastic binder resin in the embodiment, it is not limited to the polyvinyl butyrate, as far as the material for the binder resin to be used for the current collector has a lower glass-transition temperature compared with the binder resin to be used for the polarizable electrode and if the material is thermoplastic.

Embodiment 2

Figure 2:
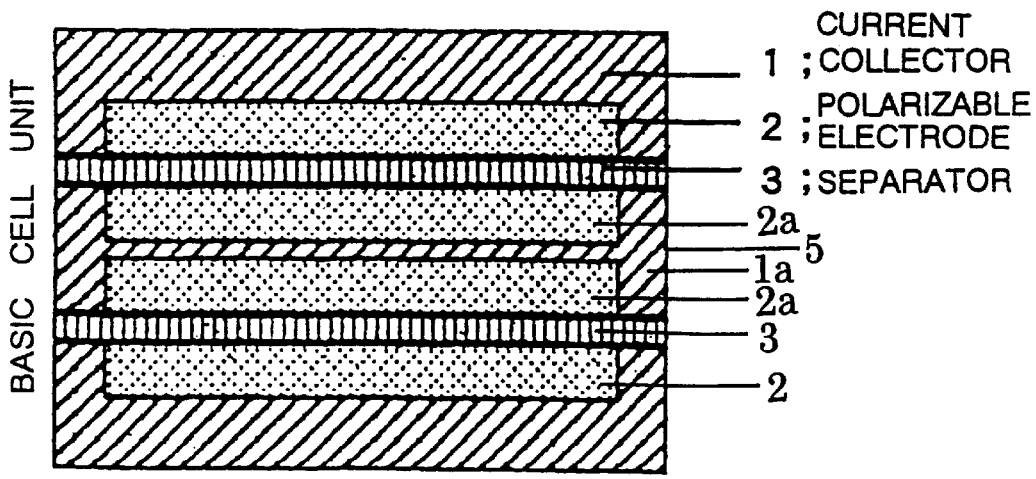
FIG. 2 is a sectional view of the electric double layer capacitor in the embodiment 2 of the present invention.

FIG. 2 is a sectional view of a structure of an electric double layer capacitor device according to embodiment 2 of the present invention wherein the electric double layer capacitor device comprises two basic cell units laminated as in embodiment 1.

This embodiment is different from embodiment 1 in that the polarizable electrode 2 (with a thickness of 40 μm) is disposed on both sides of the current collector 1 (with a thickness of 100 μm).

A method of manufacturing the electric double layer device according to the embodiment 2 is hereinafter described.

In this manufacturing method, as in the embodiment 1, a current collector and polarizable electrodes each having a specified shape are manufactured.

Subsequently, polarizable electrodes (with a thickness of 40 μm) were laminated on both sides of the prepared current collector (with a thickness of 100 μm) and were heated for one hour for press formation under the same condition (by a press pressure being 300 kg/cm$^2$ and at a press temperature being 80° C.) as in embodiment 1 so that marginal end area of the current collector and the polarizable electrode lay on the same plane.

Then, as in embodiment 1, after one hour's press formation under the press pressure of 300 kg/cm$^2$ and press temperature of 110° C., each thermoplastic binder resin contained respectively in the current collector and the polarizable electrode was made compatibilized to integrate both the current collector and polarizable electrode into one unitary structure.

Lastly, required numbers of two kinds of electrodes were prepared. The first kind relates to the polarizable electrodes 2, 2 manufactured by embodiment 1 which have been buried on one side of the current collector 1. The second kind relates to a polarizable electrodes pair 5 wherein the polarizable electrodes 2a, 2a manufactured by the specific method in this embodiment have been buried on both sides of the specific current collector 1a having a cross section of a roughly flattened H shape.

Then, after the polarizable electrodes had been impregnated with 40% by weight aqueous solution of sulfuric acid as an electrolytic solution, two basic cell units of the electric double layer capacitor were assembled to form a unitary laminated assembly. Each of the basic cell units is made up of a pair of polarizable electrodes disposed opposite to each other with a separator being interposed therebetween, as shown in FIG. 2, one being of the first kind with the others being of the second kind. The first kind electrodes pair 5 is interposed between two separators 3, 3, while each separator 3 is interposed between polarizable electrodes 2 and 2a, to be laminated to completabasic cell units assembly(laminate) of electric double layer capacitor.

The thickness of the completed electric double layer device was 320 μm (see Table 1). The thickness of the electric double layer device in this embodiment is smaller than that in embodiment 1. This is because the capacitor requires small numbers of current collectors due to the specific formation of polarizable electrodes 2a, 2a on both sides of the specific "H" shaped current collector 1a. Moreover, the internal resistance was as small as 15 m Ω which is almost the same as in embodiment 1.

Comparison Example

Figure 3:
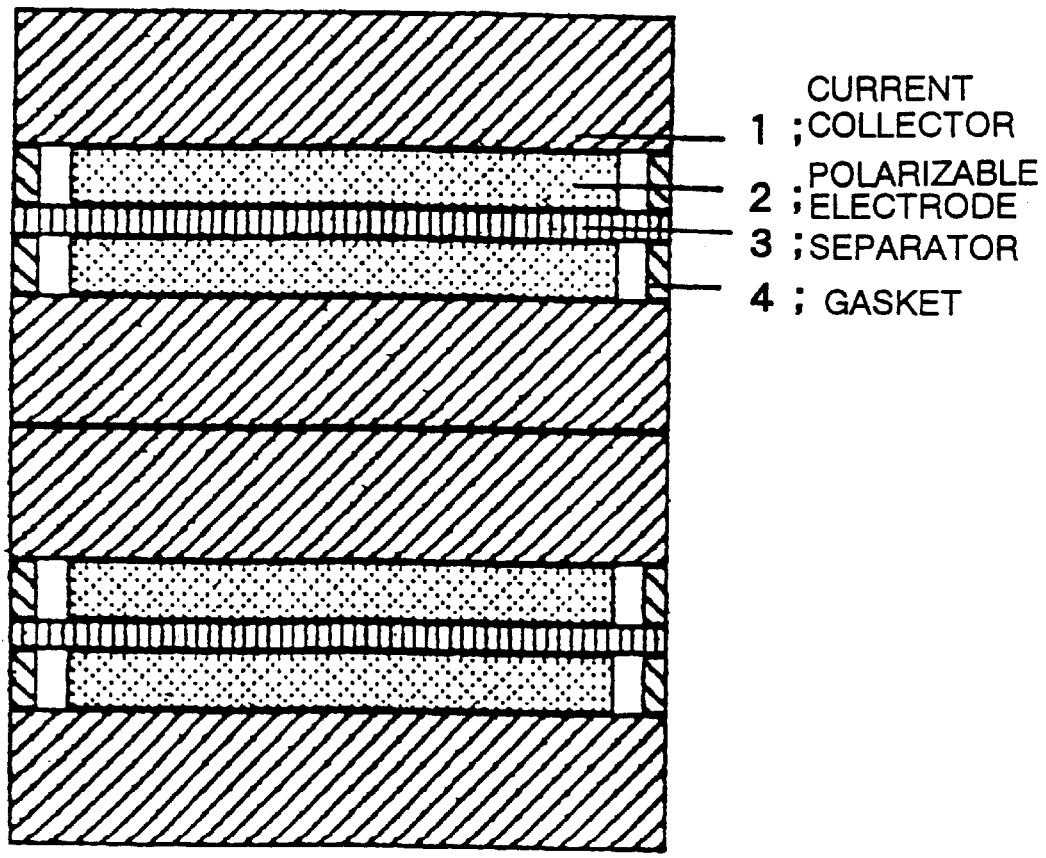
FIG. 3 is a sectional view of the conventional electric double layer capacitor.

FIG. 3 is a sectional view of a conventional electric double layer capacitor used as a comparison example. In FIG. 3, the electric double layer capacitor device is so configured that two basic cell units are laminated.

The current collector 1 (with a thickness of 100 μm) comprises electrically conductive rubber including carbon.

The polarizable electrode 2 (with a thickness of 50 μm) comprises a porous sintered body obtained by sintering fine powder of activated carbon.

The current collector 1 is laminated on the polarizable electrode 2 on the outer side of which a gasket 4 is disposed. This gasket 4 is provided in order to maintain the shape of the polarizable electrode 2 when the current collector 1 is placed opposite to the polarizable electrode 2 with a separator 3 (with a thickness of 25 μm) being interposed therebetween.

On the other hand, in the above-described embodiments 1 and 2, because the polarizable electrode 2 is fully buried in the current collector 1, thereby allowing the shape of the polarizable electrode 2 to be defined or maintained by the surrounding current collector 1, there is no need to provide the gasket 4.

The method of manufacturing the electric double layer capacitor device shown as a comparison example in FIG. 3 will be hereinafter described.

Firstly, to produce a current collector 1, carbon is added to butyl rubber and the mixture is stirred to form a sheet-shaped film. Fine powder of activated carbon is sintered at a high temperature to produce a polarizable electrode 2. Then, the obtained current collector sheet and the polarizable electrode are cut to form a specified shape, respectively.

Then, after the polarizable electrodes 2 were impregnated with the same amount of 40% aqueous solution of sulfuric acid as in the embodiments 1 and 2, the current collector 1 cut and the polarizable electrode 2 formed so as to have the specified shape, and the gasket 4 are laminated via an interposed separator 3.

After 30 minutes' heat-treatment at a temperature of 130° C., the current collector 1 made up of butyl rubber and the gasket 4 are united by vulcanization to complete an electric double layer capacitor basic cell unit.

Two of the basic cell units of the electric double layer capacitor obtained by the method described above are laminated to complete an electric double layer capacitor device.

The thickness of the conventional electric double layer capacitor device was 650 μm. The internal resistance was 200 mΩ.

Table 1 is a list of the thickness and the internal resistance of the device shown in above embodiments 1 and 2 and in the comparison example. The internal resistance of the electric double layer capacitor shown in the above embodiments 1 and 2 is smaller and the capacitor has succeeded in achieving the thinness of the product.

As described above, the present invention has the effect of implementing an electric double layer capacitor having smaller internal resistance compared with the conventional electric double layer capacitor.

This is because, according to the present invention, the contact area between the current collector and polarizable electrodes is surrounding the side of the polorizable electrode and the thermoplastic resins serving as binders are mutually compatirilized which induces the integration of the current collector and polarizable electrode, with a reduced contact resistance.

Also, the present invention has another effect of reducing the above-described internal resistance and of achieving the thicknness of the product. This is because, according to the present invention, the capacitor is so configured that the integrated current collector and polarizable electrode have their abutting surfaces to the separator on the same flat plane. Namely, the starting polarizable electrode sheet is compressed to fill and form a rim protrusion 2b surrounding the lateral side of the polarizable electrode.

What is claimed is:

1. An electric double layer capacitor comprising pairs of a current collector and a polarizable electrode disposed opposite to each other via a separator interposed therebetween, wherein each of said current collector and polarizable electrode of each said pair contains at least a thermoplastic binder resin and carbon, wherein said current collector and polarizable electrode of each said pair are made integral due to compatibilization of said thermoplastic binder resins contained therein, wherein said polarizable electrode has a surface facing said separator, said surface being disposed on the same plane as that for said current collector, and wherein the thermoplastic binder resin contained in said current collector has a glass-transition temperature lower than that of the thermoplastic binder resin contained in said polarizable electrode.

2. The electric double layer capacitor as defined in claim 1 wherein said polarizable electrodes are disposed on both sides of said current collector and wherein the current collector and the polarizable electrode have a lamination structure.

3. The electric double layer capacitor as defined in claim 1 wherein said current collector has been formed by thermal compression to provide a thinner thickness thereof.

4. An electric double layer capacitor comprising pairs of a current collector and a polarizable electrode disposed opposite to each other via a separator interposed therebetween, wherein each of said current collector and polarizable electrode of each said pair contains at least a thermoplastic binder resin and carbon, wherein said current collector and polarizable electrode of each said pair are made integral due to compatibilization of said thermoplastic binder resins contained therein, wherein said polarizable electrode has a surface facing said separator, said surface being disposed on the same plane as that for said current collector, and wherein the current collector intimately surrounds said polarizable electrodes on the polarizable electrodes' lateral side.

5. An electric double layer capacitor comprising pairs of a current collector and a polarizable electrode disposed opposite to each other via a separator interposed therebetween, wherein each of said current collector and polarizable electrode of each said pair contains at least a thermoplastic binder resin and carbon, wherein said current collector and polarizable electrode of each said pair are made integral due to compatibilization of said thermoplastic binder resins contained therein, wherein said polarizable electrode has a surface facing said separator, said surface being disposed on the same plane as that for said current collector, and wherein said electric double layer capacitor comprises at least one unit of a pair of polarizable electrodes disposed opposing each other via said current collector which surrounds the lateral sides of the polarizable electrodes.

6. The electric double layer capacitor as defined in claim 5, wherein the electric double layer capacitor further comprises (i) at least one separator and (ii) a further polarizable electrode disposed on each side of and opposing said one separator and surrounded by said current collector which contacts said one separator.

7. The electric double layer capacitor as defined in claim 5, wherein said current collector surrounding said pair of polarizable electrodes has a flattened "H" shape.

8. An electric double layer capacitor comprising pairs of a current collector and a polarizable electrode disposed opposite to each other via a separator interposed therebetween, wherein each, of said current collector and polarizable electrode contains at least a thermoplastic binder resin and carbon, wherein said current collector and polarizable electrode are made integral due to compatibilization of said thermoplastic binder resins contained therein, and wherein the thermoplastic binder resin contained in said current collector has a glass-transition temperature lower than that of the thermoplastic binder resin contained in said polarizable electrode.

9. The electric double layer capacitor as defined in claim 8, wherein said current collector has a rim protrusion which surrounds a lateral side of the polarizable electrode and abuts to the separator.

10. The electric double layer capacitor as defined in claim 9 wherein said rim protrusion has been produced through thermal compression.

* * * * *